(12) United States Patent
Ogasawara (10) Patent No.: US 7,170,845 B2
(45) Date of Patent: Jan. 30, 2007

(54) ABERRATION CORRECTING APPARATUS

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 566 days.

(21) Appl. No.: 10/050,604

(22) Filed: Jan. 18, 2002

(65) Prior Publication Data

US 2002/0105890 A1    Aug. 8, 2002

(30) Foreign Application Priority Data

Feb. 6, 2001    (JP)    ............................. 2001-030106

(51) Int. Cl.
    *G11B 7/00*    (2006.01)
(52) U.S. Cl. ............................... 369/112.02; 369/53.33
(58) Field of Classification Search ........... 369/112.02, 369/112.01, 112.24, 53.33, 44.32, 53.12; 359/16, 366
    See application file for complete search history.

(56) References Cited

U.S. PATENT DOCUMENTS

| | | | | |
|---|---|---|---|---|
| 5,726,436 A | * | 3/1998 | Oka et al. ................... | 359/637 |
| 5,889,750 A | * | 3/1999 | Summers et al. ....... | 369/112.24 |
| 5,905,700 A | * | 5/1999 | Best et al. ................ | 369/44.26 |
| 6,034,935 A | * | 3/2000 | Kim et al. ................ | 369/53.28 |
| 6,411,576 B1 | * | 6/2002 | Furukawa et al. ....... | 369/53.19 |
| 6,418,108 B1 | * | 7/2002 | Ueda et al. ............. | 369/112.23 |
| 6,496,453 B2 | * | 12/2002 | Asada et al. ............. | 369/44.23 |
| 6,552,984 B1 | * | 4/2003 | Yamazaki et al. ....... | 369/53.19 |
| 6,885,616 B2 | * | 4/2005 | Kikuchi et al. .......... | 369/44.23 |
| 2001/0021162 A1 | * | 9/2001 | Kikuchi et al. ........ | 369/112.02 |

* cited by examiner

*Primary Examiner*—Andrea Wellington
*Assistant Examiner*—Lixi Chow
(74) *Attorney, Agent, or Firm*—Sughrue Mion, PLLC (57) ABSTRACT

An aberration correcting element includes a first aberration correction element movable along the optical axis of the light beam for correcting the aberration of the light beam; a driver for positioning the first aberration correction element along the optical axis in response to a drive control signal; a second aberration correction element having a plurality of phase adjustment portions each generating an amount of phase change in the light beam, the amount corresponding to an adjustment signal; a phase adjuster for supplying the adjustment signal to the respective adjustment portions in response to a phase control signal; a light receiver for receiving the light beam reflected from the recording medium to generate a light-receiving signal; and a controller for generating the drive control signal and the phase control signal based on the light-receiving signal.

7 Claims, 9 Drawing Sheets

ABERRATION DISTRIBUTION AFTER CORRECTION BY BEAM EXPANDER

FIG. 6

ABERRATION DISTRIBUTION OF THE LIGHT BEAM BEFORE CORRECTION

FIG. 9

ABERRATION DISTRIBUTION
AFTER CORRECTION BY LIQUID CRYSTAL

FIG. 8

DISTRIBUTION OF PHASE DIFFERENCE
PROVIDED BY LIQUID CRYSTAL

FIG. 10

ABERRATION CORRECTING APPARATUS

BACKGROUND OF THE INVENTION

1. Field of the Invention

The present invention relates to an aberration correcting apparatus for correcting aberration of a light beam in an optical system.

2. Description of the Related Art

Optical discs such as a CD (Compact Disc) and a DVD (Digital Video Disc or Digital Versatile Disc) are well known as information recording media for optically recording and reproducing information. Furthermore, there are various types of optical discs, for example, optical discs for reproduction only, write-once optical discs on which only additional recording can be done, and rewritable optical discs on which information can be erased and re-recorded.

Research and development are in progress for developing high-density optical discs and optical pickups and information recording and/or reproducing apparatuses (hereinafter referred to as recording/reproducing apparatus) applicable to the high-density optical discs. In addition, research and development have also been pursued for developing optical pickups and information recording/reproducing apparatuses having the capability to be used for optical discs of different types.

A method of using with the high-density discs by increasing a numerical aperture (NA) of an objective lens provided in the pickup apparatus has been considered. Another method is the use of a light beam having a shorter wavelength.

However, the aberration of the light beam caused by an optical disc is increased as the numerical aperture NA of the objective lens is increased or a light beam having a shorter wavelength is used. This makes it difficult to improve performance accuracy of the recording/reproduction of information.

For example, when an objective lens having a large numerical aperture is used, the amount of birefringence distribution, which depends on the incidence angle, is increased at the pupil surface of the optical disc, since the range of the incidence angle of the light beam to the optical disc is increased. This creates an aberration problem due to the birefringence becoming more influential. In addition, the effect of aberration produced by error in the thickness of a disc cover layer for protecting the disc recording surface increases.

Such an aberration correcting apparatus is disclosed, for example, in Japanese Patent Laid-Open Publication Kokai No. 2000-131603. The apparatus includes two groups of lenses (or beam expander) to correct spherical aberration of the light beam produced at the optical disc by varying a distance between the lenses along an optical axis of the light beam. Another aberration correcting apparatus disclosed in Japanese Patent Laid-Open Publication Kokai No. H10-106012 includes a coupling lens for correcting the spherical aberration of the light beam produced at the optical disc by varying the distance between a laser source and the coupling lens along the optical axis of the light beam.

However, the object lens and the aberration correction lens are separately driven so that displacement occurs between the lenses in the above-described aberration correcting apparatuses. The aberration is corrected coarsely to ensure tolerance to the displacement, and thus unremoved spherical aberration remains. The residual spherical aberration obstructs signal-recording/reproducing operation, particularly in an optical disc having large thickness error of covering layer or a multi-layered recording disc having a plurality of recording layers.

As another conventional technique for reducing the aforementioned aberration, an optical pick-up apparatus having a liquid crystal element for aberration correction is proposed. An example of such aberration correction element is disclosed in Japanese Patent Laid-Open Publication Kokai No. H10-269611. The aberration correction element has a plurality of phase adjustment portions formed concentrically and predetermined voltages are applied to the phase adjustment portions to adjust orientation of the liquid crystal molecules. Thus, the aberration of a light beam can be corrected. It is, however, necessary to increase a thickness of the liquid crystal and apply a large voltage to the liquid crystal in order to correct an aberration larger than a wavelength of the light source. Furthermore, a number of phase adjustment portions must be provided to correct various magnitudes of wave front aberrations. Therefore, a large number of electrodes must be provided, resulting in complicated wiring. Accordingly, the aberration correction element has been difficult to be sophisticated in terms of size, thickness and response. Also, it is a problem that increase of the liquid crystal thickness produces frequency response deterioration of the aberration correction element.

OBJECT AND SUMMARY OF THE INVENTION

The present invention has been made to overcome the above-described problems, and it is an object of the present invention to provide a high-performance aberration correcting apparatus, which is small-sized and tolerant to the optical axis displacement and has a high aberration correction capability.

To achieve the object, according to one aspect of the present invention, there is provided a aberration correcting apparatus for correcting aberration in an optical path of an optical system which irradiates a recording medium with a light beam and guides the light beam reflected from the recording medium, which comprises a first aberration correction element movable along the optical axis of the light beam for correcting the aberration of the light beam; a driver for positioning the first aberration correction element along the optical axis in response to a drive control signal; a second aberration correction element having a plurality of phase adjustment portions each generating an amount of phase change in the light beam, the amount corresponding to an adjustment signal; a phase adjuster for supplying the adjustment signal to the respective adjustment portions in response to a phase control signal; a light receiver for receiving the light beam reflected from the recording medium to generate a light-receiving signal; and a controller for generating the drive control signal and the phase control signal based on the light-receiving signal.

DETAILED DESCRIPTION OF THE PREFERRED EMBODIMENTS

Referring to the attached figures, the preferred embodiments of the present invention will be described in detail. In the figures used in the following description, substantially identical components are indicated by identical numerals.

First Embodiment

Figure 1:
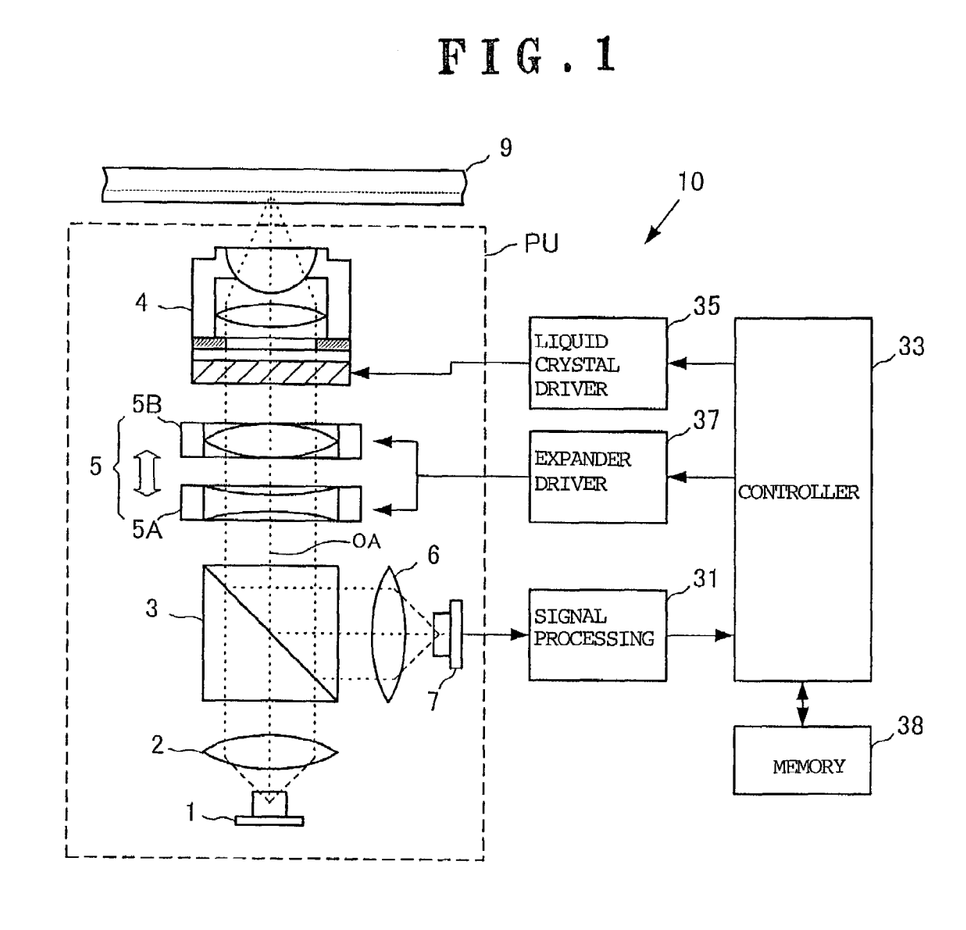
FIG. 1 is a block diagram illustrating a configuration of an aberration correcting apparatus according to a first embodiment of the present invention.

FIG. 1 is a block diagram illustrating the configuration of an aberration correcting apparatus according to a first embodiment of the present invention.

A laser light source 1 provided in an optical pick-up apparatus PU emits laser light, for example, having a wavelength ($\lambda$) of 405 nanometers (nm). A collimating lens 2 collimates the light beam emitted from the laser light source 1. The light beam is then irradiated on an optical disc 9 via a beam splitter 3, a beam expander 5, and an aberration correction assembly 4. The irradiated light beam is reflected by the optical disc 9. The reflected light is reflected again by the beam splitter 3 after passing through the aberration correction assembly 4 and the beam expander 5, then focused by a condenser 6, and detected by an optical detector 7.

Figure 2:
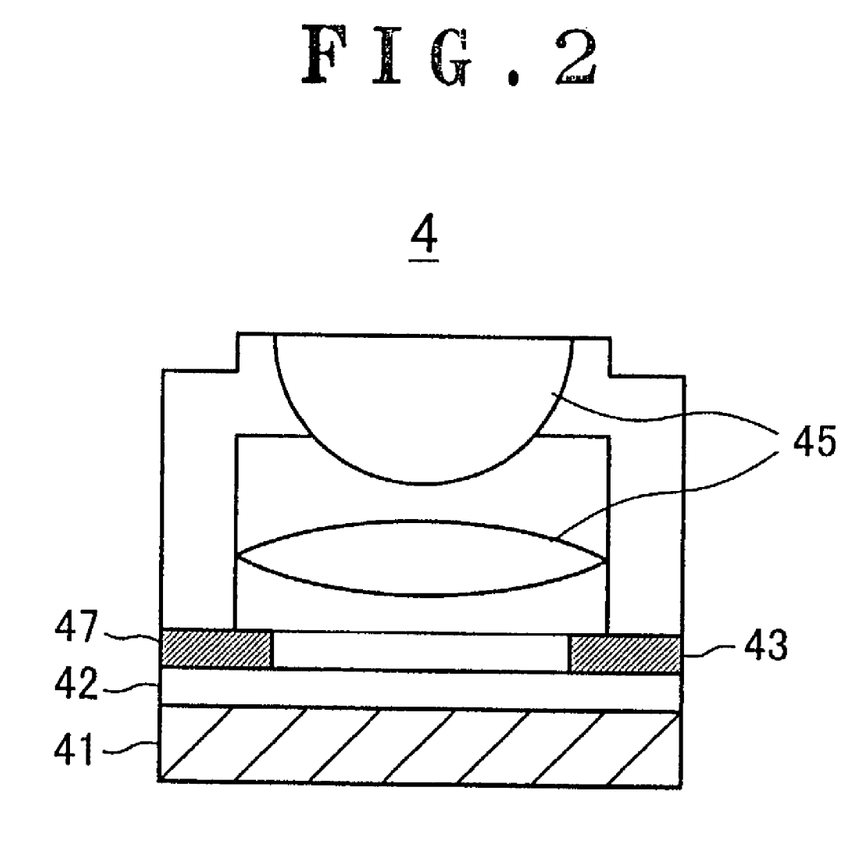
FIG. 2 is a sectional view schematically illustrating a configuration of an aberration correction assembly.

The aberration correction assembly 4 includes an aberration correction element 41, a quarter wavelength plate 42, an aperture stop 43, and a high NA object lens having two lenses as shown in the sectional view of FIG. 2. These optical components are held by a lens-barrel 47. The aberration correction element 41 and the high NA object lens 45 are securely aligned with each other such that their optical axes in alignment with each other.

The aberration correction element 41 has an electro-optical element providing electro-optic effect upon application of electric field. The aberration correction element 41 has an optical element, for example a liquid crystal element, providing birefringence-based variation depending on amplitude of applied control voltage Vi. More specifically, the aberration correction element 41 has a configuration in which a liquid crystal layer 19 is sandwiched between a first electrode layer 17 and a second electrode layer 18, as shown schematically in the perspective view of FIG. 3. The liquid crystal layer 19 has a liquid crystal orientation film 21, a transparent insulating layer 23, and the first electrode layer 17 successively formed on one side. The liquid crystal layer 19 also has a liquid crystal orientation film 22, a transparent insulating layer 24, and the second electrode layer 18 successively formed on the other side. Insulating substrates 15 and 16 such as transparent glass substrate are formed on the first and second electrode layers 17 and 18, respectively.

Figure 3:
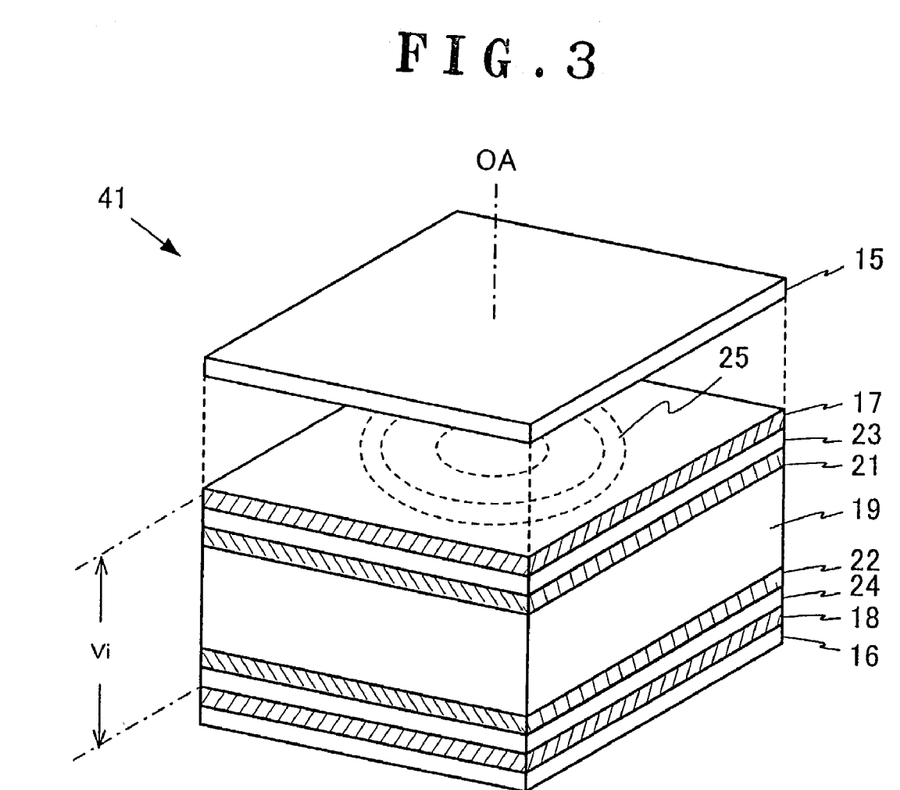
FIG. 3 is a perspective view schematically illustrating a structure of an aberration correction element.

At least one of the first and second electrode layers 17 and 18 has a plurality of electrodes corresponding to a plurality of phase adjustment portions for correcting the aberration of the light beam transmitted through the aberration correction element 41 by applying voltage corresponding to profile of the aberration distribution of the light beam to each of the plurality of electrodes. The following description will be given with reference to an example where the first electrode layer 17 has a plurality of electrodes.

Figure 4:
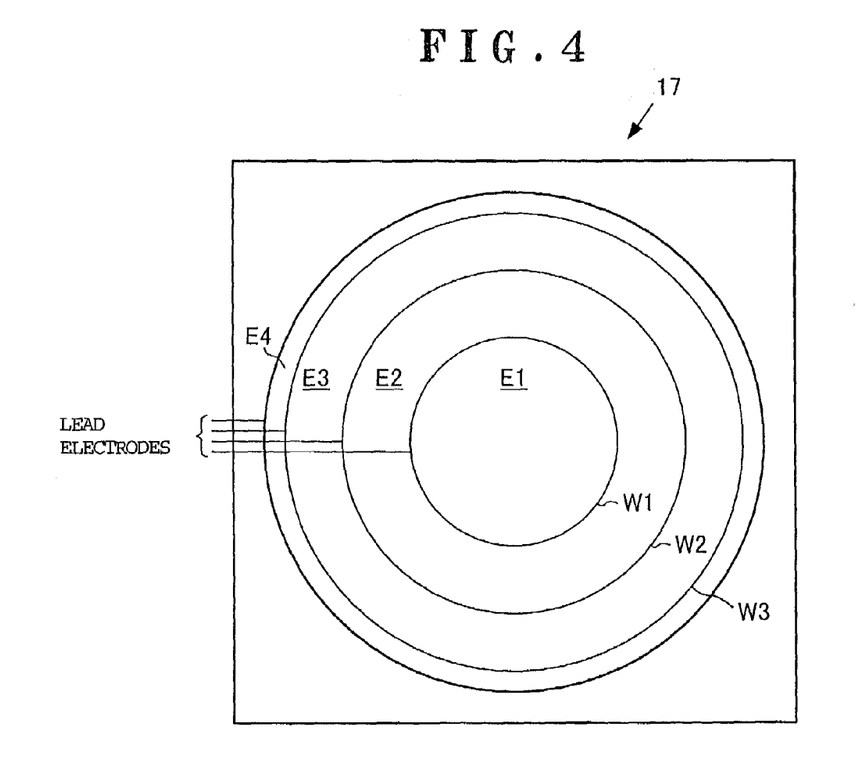
FIG. 4 is a plan view schematically illustrating a structure of a first electrode layer of the aberration correction element for correcting spherical aberration.

A structure of the first electrode layer 17 of the aberration correction element 41 for correcting the spherical aberration is shown schematically in the plan view of FIG. 4. The first electrode layer 17 is composed of a plurality of concentric (annular) electrodes $E_i$ ($i=1,2,...$) which are divided and electrically separated by gaps $W_i$ ($i=1,2,...$) correspondingly with the distribution of the spherical aberration caused by the optical disc 9. FIG. 4 shows the first electrode layer 17 which has four electrodes as an example. When control voltages $V_i$ ($i=1,2,...$) are applied to the electrodes $E_i$ via lead electrodes, orientation of the liquid crystal molecules in the respective areas of the liquid crystal layer 19 is varied in response to electric field induced by the control voltages $V_i$. As a result, phase of the light transmitting through the liquid crystal layer 19 varies due to birefringence of the liquid crystal layer 19. Accordingly, the phase can be controlled using the control voltages $V_i$ applied to the electrode layers 17 and 18.

Arrangement of the electrodes are designed to be suitable for correcting the residual spherical aberration in the aberration correction by the aberration correction lens.

The beam expander 5 having a concave lens 5A and a convex lens 5B as a group of aberration correction lenses has an actuator (not shown). The beam expander 5 is configured to correct the spherical aberration of the light beam caused by the optical disc 9, by moving any one of the concave lens 5A and the convex lens 5B along the optical axis of the light beam. The actuator can be driven by controlling electric power supplied thereto. The actuator may include a voice coil. Either of the concave lens 5A or the convex lens 5B can be displaced by varying electric current supplied to the voice coil. The actuator is not limited to the above, and may be a piezoelectric element that can be controlled by a voltage supplied thereto.

Referring again to FIG. 1, an RF read signal detected by the optical detector 7 is sent to a signal processing circuit 31. The signal processing circuit 31, based on the received RF signal, generates a signal for controlling the aberration correction assembly 4 and the beam expander 5 to send the control signal to a controller 33.

The controller 33 determines the aberration of the light beam, based on a signal such as an RF amplitude signal received from the signal processing circuit 31, and/or according to a predetermined processing procedure. Further, the controller 33 determines driving amount of each of the phase adjustment portions of the aberration correction element 41 and the beam expander 5, as described later, based on the aberration of the light beam. The controller 33 provides control signals representing the corresponding driving amount to a liquid crystal driver circuit 35 for driving the aberration correction element 41, and an expander driver circuit 37 for driving the actuator of the beam expander 5, respectively. The liquid crystal driver circuit 35 generates a corresponding driving voltage to be applied to the aberration correction element 41 in response to the corresponding control signal to supply to the aberration correction element 41. The expander driver circuit 37 generates a corresponding driving current in response to the control signal for supply to the beam expander 5.

The controller 33 is connected to a storage device (or memory) 38 including a ROM (Read Only Memory) and a RAM (Random Access Memory) for storing data and commands for use in various controls.

Figure 5:
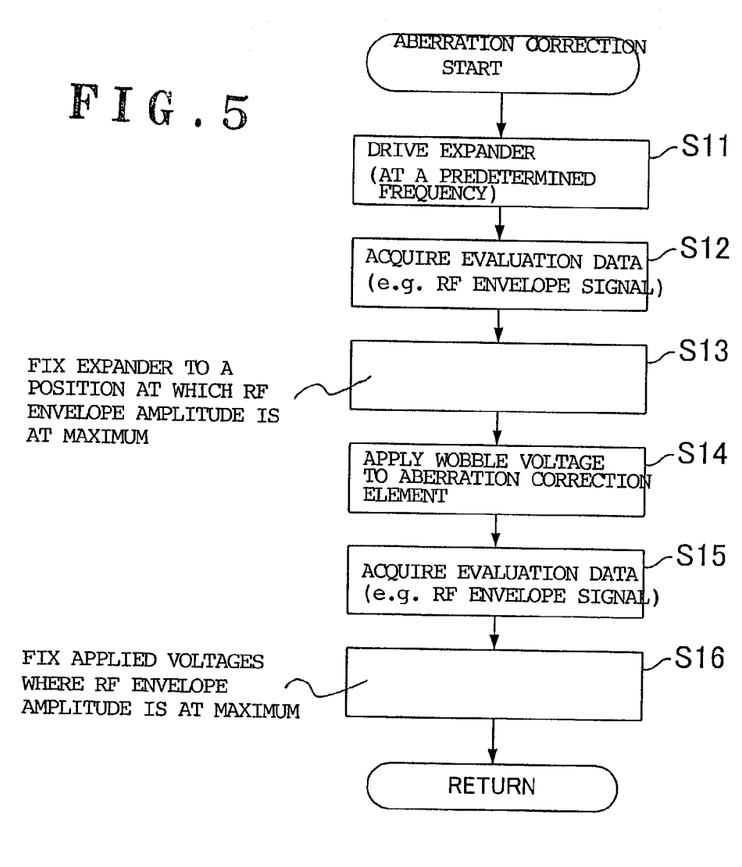
FIG. 5 is a flowchart illustrating a procedure of aberration correction by the aberration correcting apparatus.

A procedure of the aberration correction by the aberration correction element 41 will be described in detail with reference to a flowchart shown in FIG. 5. Following description will be given with respect to a correction of the spherical aberration caused by the optical disc 9. Such aberration correction is performed under control of the controller 33.

The controller 33 provides the control signal to the expander driver circuit 37 for oscillating any one of the concave lens 5A and the convex lens 5B of the beam expander 5 along the optical axis at a predetermined frequency (step S11). This produces time-variation of an incident angle of the light beam from the beam expander 5 to the object lens 45 and variation of the light beam aberration. Accordingly, the RF read signal varies in response to the variation of the aberration. The controller 33 acquires an evaluation data corresponding to the light beam aberration from the RF read signal. The signal processing circuit 31 detects, for example, an envelope signal of the RF read signal, and sends the envelope signal to the controller 33 as a corresponding evaluation data. On this occasion, the controller 33 acquires an amplitude of the RF envelope signal received from the signal processing circuit 31, correspondingly with a distance between the aberration correction lenses of the beam expander 5 (step S12).

Then, the aberration correction lens of the beam expander 5, driven by the expander driver circuit 37, is fixed to a position (i.e., optimum position) at which the RF envelope amplitude is at its maximum, or the aberration is at its minimum (step S13).

Figure 6:
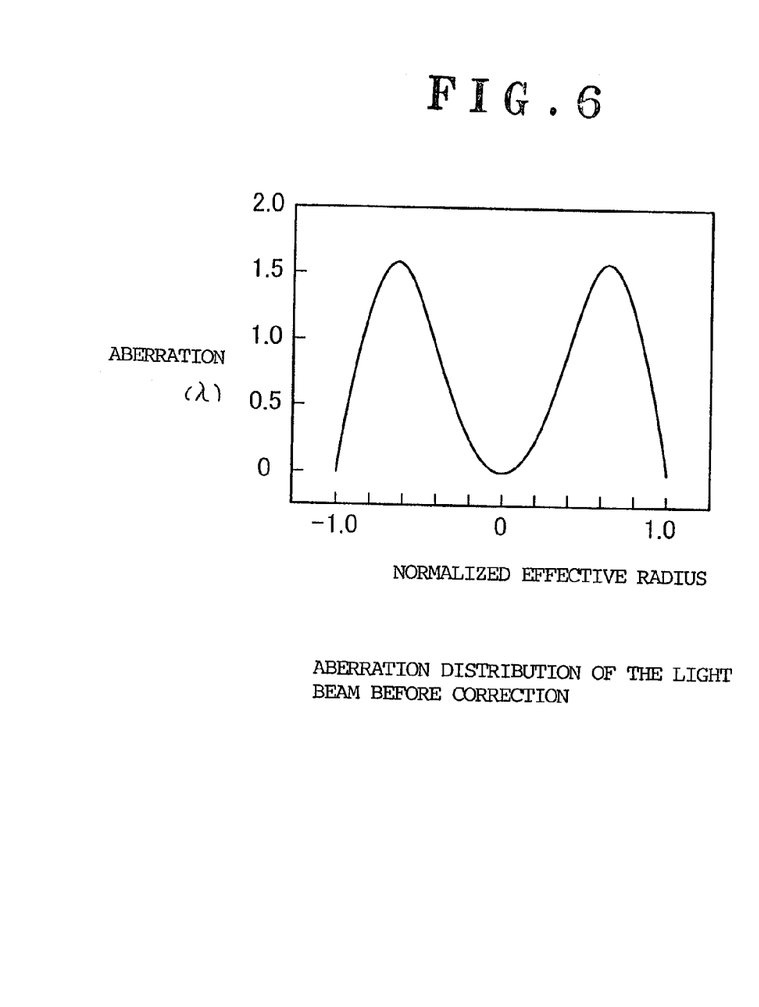
FIG. 6 is a view illustrating an aberration distribution of the light beam in the plane including the optical axis before correction versus normalized effective radius of an optical path.
Figure 7:
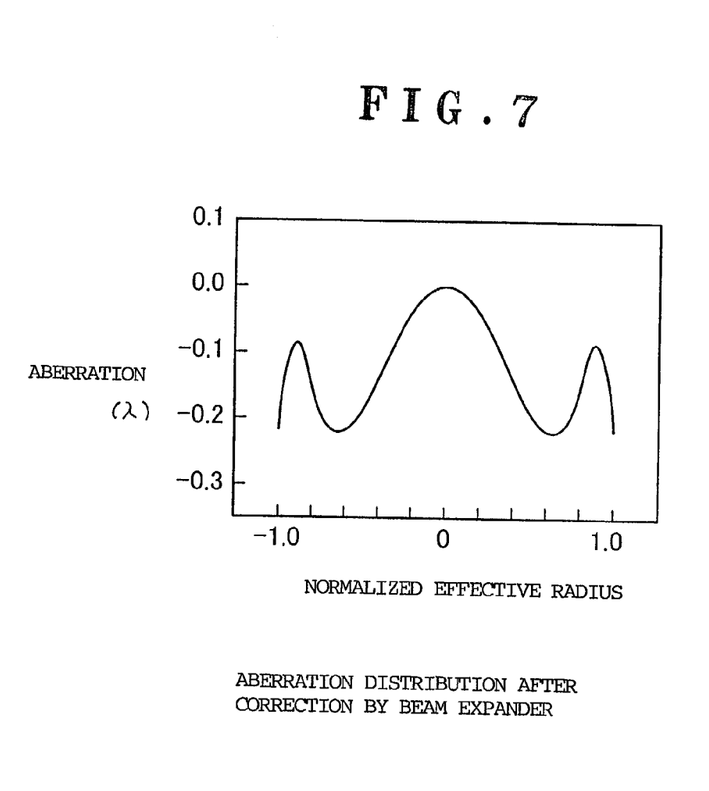
FIG. 7 is a view illustrating an aberration distribution of the light beam after correction by a beam expander.

FIG. 6 and FIG. 7 show the aberration distributions of the light beam versus normalized effective values of the optical path in the plane including the optical axis before and after correction by the beam expander 5, respectively. These are examples where thickness error of the covering layer is 50 micrometers (μm). While the aberration distribution of the light beam is 1.6λ (λ is a wavelength of the light beam) at its maximum before correction, the residual wave front aberration is reduced to 0.2λ in amplitude (in absolute value) due to the correction by the beam expander 5.

After determining the correction amount by the beam expander 5, the controller 33 applies a wobble voltage, oscillating at a predetermined frequency with a predetermined amplitude around a predetermined center voltage, to each of the electrodes of the aberration correction element 41 through the liquid crystal driver circuit 35 (step S14). Phase difference, provided from the aberration correction element 41 to the light beam, varies in response to the applied voltages. The aberration of the light beam varies in response to the phase variation, so that the RF read signal varies. The controller 33 acquires the evaluation data corresponding to the aberration of the light beam from the RF read signal. The controller 33 acquires, for example, the amplitude of the RF envelope signal correspondingly with the applied voltages to the respective electrodes of the aberration correction element 41 in a similar manner as described above (step S15).

The applied voltages are fixed to the voltages at which the aberration is at its minimum, or the RF envelope amplitude is at its maximum (step S16).

Figure 8:
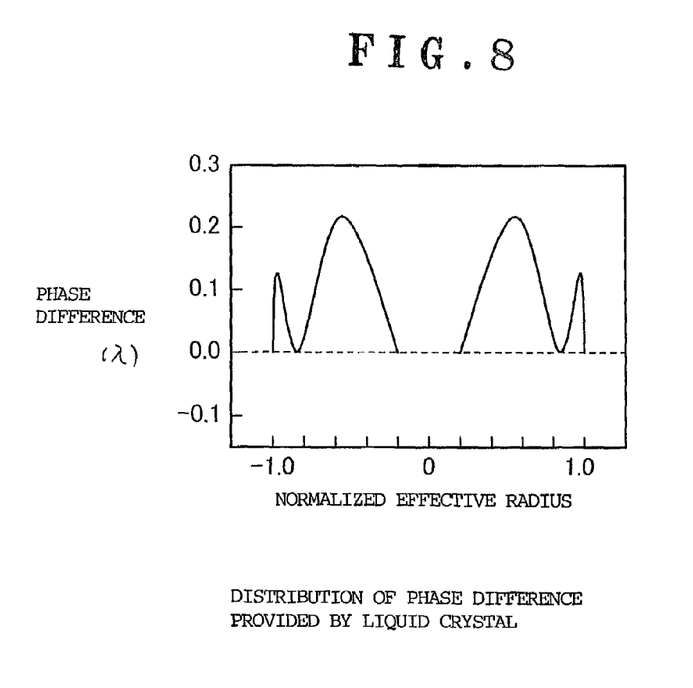
FIG. 8 is a view illustrating a distribution of phase difference, provided to the light beam by the aberration correction element, versus normalized effective radius of the optical path.
Figure 9:
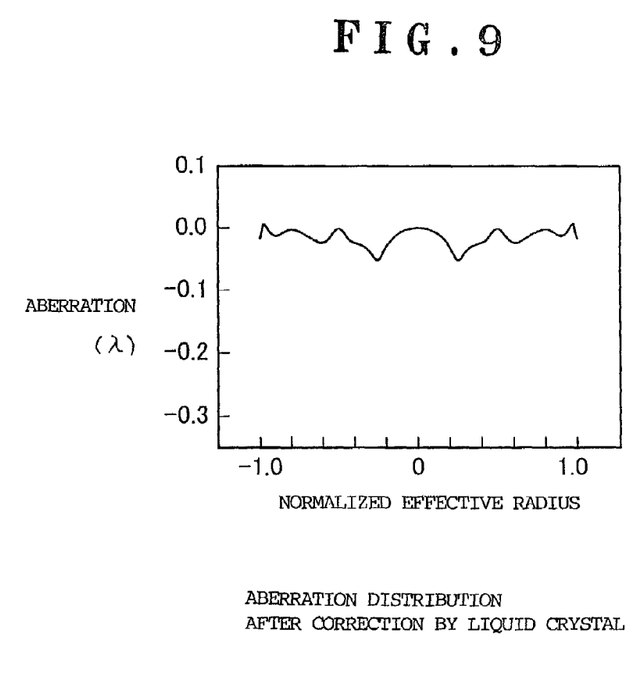
FIG. 9 is a view of an aberration distribution of the light beam after correction by the aberration correction element.

FIG. 8 shows a distribution of the phase difference, which is provided by the aberration correction element 41 (i.e., the liquid crystal 19) versus normalized effective radius of the optical path when the applied voltages are fixed to the voltages at which the RF envelope amplitude is at its maximum. The aberration after correction by the beam expander 5 shown in FIG. 7 can be further corrected by producing such a phase difference distribution by the liquid crystal 19. FIG. 9 shows an aberration distribution versus normalized effective radius after correction by the aberration correction element 41. The aberration distribution of the light beam is reduced to approximately 0.05λ in amplitude (in absolute value) due to the correction.

According to the correction procedure, the aberration in the light beam can be corrected.

Figure 10:
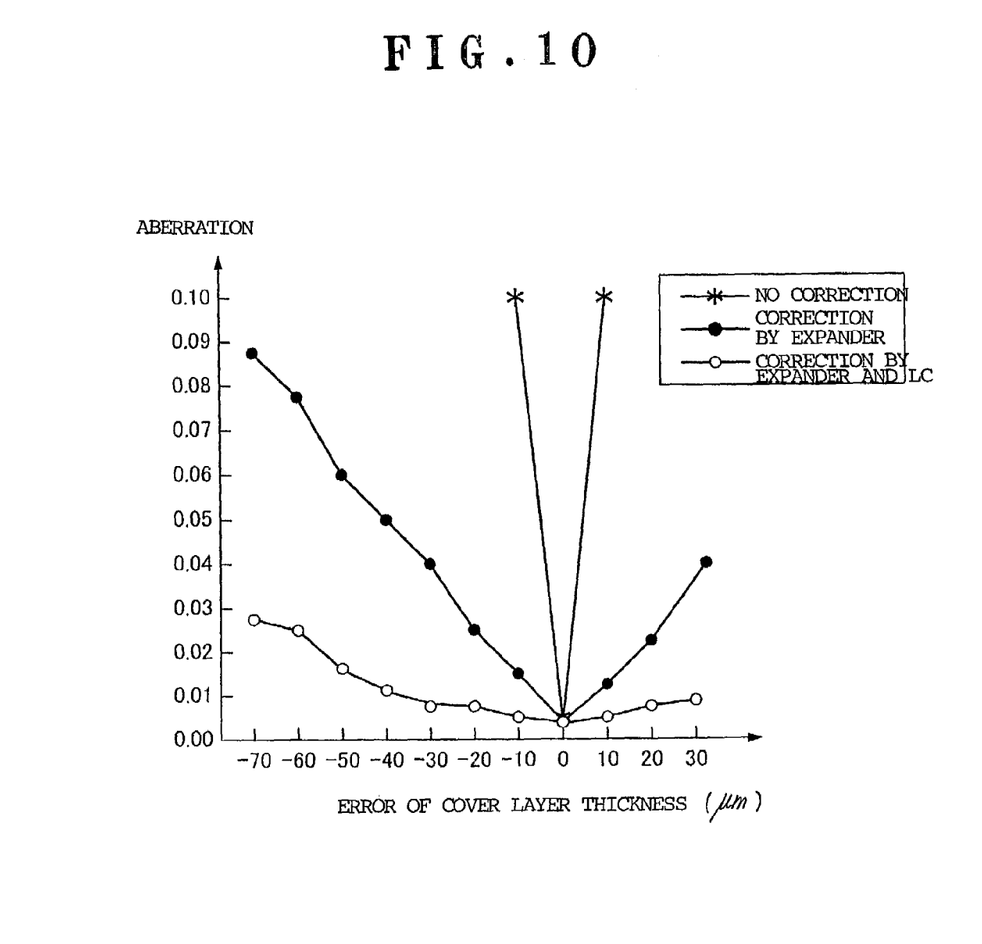
FIG. 10 is a graph illustrating an aberration correction effect versus error of the covering layer thickness.

FIG. 10 is a graph illustrating an effect of the aberration correction versus error of the covering layer thickness. It is clear that the large aberration of the light beam is sufficiently restrained by correction using the beam expander 5 and the liquid crystal 19 according to the present invention.

The aforementioned evaluation data or value is not limited to the RF envelope signal amplitude, and any other value representing the light beam aberration may be used. An error rate or jitter amount of the RF read signal may, for example, be used as the evaluation value and the value is adjusted to be best.

In addition, the method for obtaining the optimum position of the beam expander 5 and the optimum value of the applied voltages to the respective electrodes of the aberration correction element 41 is not limited to the method described above. Various typical optimization methods or a convergence method using a processing loop can be used. For example, a particular method can be used in which position of the aberration correction lenses of the beam expander 5 and the applied voltages to the aberration correction element 41 are varied only in extent of the respective predetermined values. Then, variation and sign (positive or negative) of the evaluation values are obtained to determine a driving amount and sign of the position and the applied voltages for convergence.

As described above, the aberration correcting apparatus according to the present invention is a hybrid-type apparatus using the beam expander 5 together with the aberration correction element 41. Hereinafter, performances and advantages of the apparatus will be described in detail. The beam expander 5 is configured separately from the object lens 45, and mainly corrects a low-order and large aberration. The beam expander 5 generates the second-order wavefront aberration by itself. Therefor, the beam expander 5 is not capable of correcting the spherical aberration alone. However, when the light beam with a certain image height is led to irradiate the object lens 45, there is generated a spherical aberration according to the characteristics of the object lens 45. Consequently, spherical aberration caused by, for example, an error of the covering layer thickness can be cancelled.

The beam expander 5 slightly bends the beam angle. Therefore, when image height characteristic of the object lens 45 is sufficient, no problem arises because the wavefront caused by the object lens 45 varies slightly even if an alignment displacement occurs between the object lens 45 and the beam expander 5 in an operation such as tracking. On the other hand, the aberration collection element 41 is formed integrally with the object lens 45 and thus aligned precisely. The liquid crystal 19 of the aberration correction element 41 principally corrects a high-order and small aberration. The aberration correction element 41, in contrast to the beam expander 5, corrects an aberration which is actually generated. In other words, the aberration correction element 41 corrects aberration independently of the characteristics of the object lens 45.

As described above in detail, a high-performance aberration correcting apparatus can be provided. The apparatus is small-sized and resistant to the displacement of the optical axis and has a high aberration correction capability.

Second Embodiment

Figure 11:
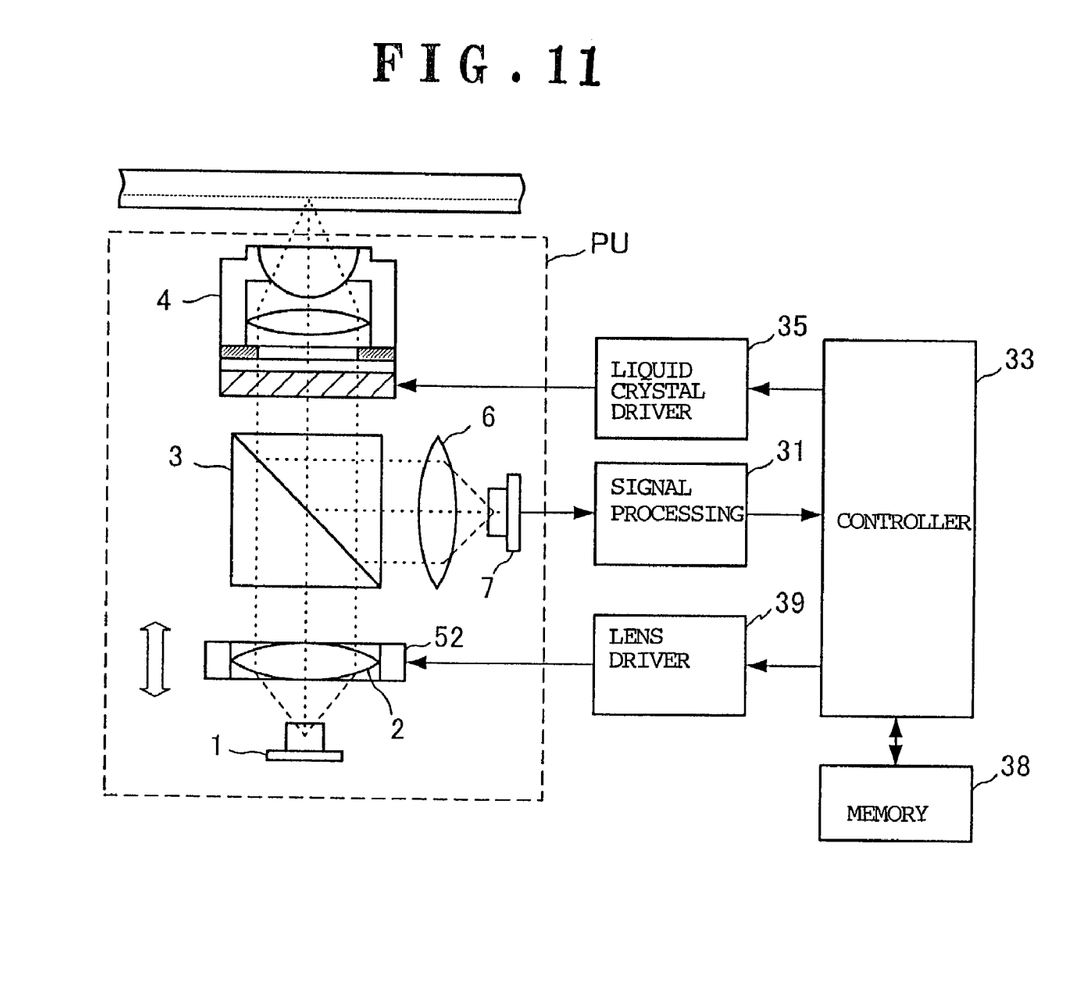
FIG. 11 is a block diagram illustrating a configuration of the aberration correcting apparatus according to a second embodiment of the present invention.

FIG. 11 is a block diagram illustrating mostly the configuration of the optical pick-up section of the aberration correcting apparatus 10 according to a second embodiment of the present invention.

In the embodiment, the position of the collimating lens 2 for collimating the emitted light beam can be varied. It should be noted that the beam expander is not used. More particularly, the aberration correcting apparatus 10 has a collimating lens assembly 52. The collimating lens assembly 52 includes the collimating lens 2 and an actuator (not shown). The collimating lens 2 can be moved along the optical axis of the light beam by a lens driver circuit 39 under control of the controller 33, thereby varying the aberration of the light beam.

According to the configuration, similar effects and advantages to the aforementioned first embodiment can be obtained.

Further, in the second embodiment, instead of driving the collimating lens assembly 52, the light source 1 may incorporate an actuator, and a driver circuit (not shown) may move the light source 1 along the optical axis of the light beam under control of the controller 33.

While the invention has been described with reference to the embodiments of the aberration correcting apparatus for use in the optical pickup for the optical discs, it is not limited to the apparatus. The present invention can be applied to apparatuses for correcting aberrations in various optical systems. In addition, it should be noted that the numerical values given in the above embodiments are merely exemplary. The above-described embodiments can be utilized with appropriate modifications or in combinations.

As apparent from the foregoing, the present invention provides a high-performance aberration correcting apparatus, which is small-sized and tolerant to the optical axis displacement and has a high aberration correction capability.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No.2001-30106 which is hereby incorporated by reference.

What is claimed is:

1. An aberration correcting apparatus for correcting aberration in an optical path of an optical system which irradiates a recording medium with a light beam and guides the light beam reflected from said recording medium, comprising:
   an object lens for focusing the light beam on said recording medium;
   a first aberration correction element movable along the optical axis of said light beam for performing coarse correction of the aberration of the light beam;
   a driver for positioning said first aberration correction element along the optical axis in response to a drive control signal;
   a second aberration correction element having a plurality of phase adjustment portions each generating an amount of phase change in the light beam to perform fine correction for a residual aberration of said first aberration correction element, the amount corresponding to an adjustment signal and said second aberration correction element being integrally formed with said object lens so as to be in alignment with each other;
   a phase adjuster for supplying said adjustment signal to the respective adjustment portions in response to a phase control signal;
   a light receiver for receiving the light beam reflected from said recording medium to generate a light-receiving signal; and
   a controller for generating said drive control signal and said phase control signal based on said light-receiving signal, wherein said phase adjuster corrects the residual aberration of said first aberration correction element.

2. The aberration correcting apparatus according to claim 1, wherein said first aberration correction element includes a concave lens and a convex lens sequentially arranged from a light source of the light beam, and said driver drives said convex lens.

3. The aberration correcting apparatus according to claim 1, wherein said first aberration correction element includes a concave lens and a convex lens sequentially arranged from a light source of the light beam, and said driver drives said concave lens.

4. The aberration correcting apparatus according to claim 1, wherein said first aberration correction element includes a collimating lens for collimating the light emitted from a light source of the light beam.

5. The aberration correcting apparatus according to claim 1, wherein said first aberration correction element includes a collimating lens for collimating the light emitted from a light source of the light beam, and said driver changes a distance between said light source and said collimating lens.

6. The aberration correcting apparatus according to claim 1, wherein said second aberration correction element is a liquid crystal panel.

7. The aberration correcting apparatus according to claim 1, wherein said second aberration correction element and said object lens are aligned such that their optical axes are in alignment with each other.

* * * * *